(12) United States Patent
Sai

(10) Patent No.: US 9,329,074 B2
(45) Date of Patent: May 3, 2016

(54) MULTI-MODE PULSED RADAR PROVIDING AUTOMATIC TRANSMIT PULSE SIGNAL CONTROL

(71) Applicant: HONEYWELL INTERNATIONAL INC., Morristown, NJ (US)

(72) Inventor: Bin Sai, Zuid Holland (NL)

(73) Assignee: Honeywell International Inc., Morristown, NJ (US)

( * ) Notice: Subject to any disclaimer, the term of this patent is extended or adjusted under 35 U.S.C. 154(b) by 399 days.

(21) Appl. No.: 14/099,152

(22) Filed: Dec. 6, 2013

(65) Prior Publication Data

US 2015/0160067 A1    Jun. 11, 2015

(51) Int. Cl.
| | |
|---|---|
| G01S 7/34 | (2006.01) |
| G01S 7/52 | (2006.01) |
| G01S 13/88 | (2006.01) |
| G01F 23/284 | (2006.01) |
| G01S 7/285 | (2006.01) |
| G01S 13/10 | (2006.01) |
| G01S 13/26 | (2006.01) |
| G01S 13/28 | (2006.01) |
| G01S 13/02 | (2006.01) |
| G01S 7/529 | (2006.01) |
| G01S 7/40 | (2006.01) |

(52) U.S. Cl.
CPC ............ *G01F 23/284* (2013.01); *G01S 7/285* (2013.01); *G01S 7/4008* (2013.01); *G01S 13/106* (2013.01); *G01S 13/26* (2013.01); *G01S 13/282* (2013.01); *G01S 7/34* (2013.01); *G01S 7/529* (2013.01); *G01S 7/52033* (2013.01); *G01S 13/0209* (2013.01); *G01S 13/88* (2013.01); *G01S 2007/4013* (2013.01)

(58) Field of Classification Search
CPC ....... G01S 7/34; G01S 7/489; G01S 7/52033; G01S 7/529; G01S 7/5354; G01S 13/88; G01F 23/284; G01F 23/2845
USPC ............................................... 342/91, 92, 124
See application file for complete search history.

(56) References Cited

U.S. PATENT DOCUMENTS

| | | | | |
|---|---|---|---|---|
| 3,742,438 | A * | 6/1973 | Brede | G01S 7/529 342/91 |
| 3,946,322 | A * | 3/1976 | Katz | G01S 7/282 327/176 |
| 4,125,835 | A * | 11/1978 | Barry | G01S 13/18 342/135 |
| 4,194,200 | A * | 3/1980 | Goldie | H03G 11/025 333/13 |

(Continued)

*Primary Examiner* — Peter Bythrow
(74) *Attorney, Agent, or Firm* — Jetter & Associates, P.A.

(57) ABSTRACT

A multi-mode pulsed radar method for sensing or measuring a product material in a storage tank includes providing a measure of radar signal attenuation for pulsed radar signals transmitted to the product material. Automatic adjustment of one or more transmitted radar pulse parameters is implemented by selecting a pulse width and a pulse amplitude based on the measure of radar signal attenuation. In signal mode 2 higher amplitude and/or wider pulses are selected when the measure of radar signal attenuation is relatively high and in signal mode 1 lower amplitude and/or narrower pulses are selected when the measure of radar signal attenuation is relatively low. The radar pulse is transmitted to the product material using the selected pulse width and the pulse amplitude. The target signal reflected or scattered from the product material is processed to determine at least one parameter, such as product level.

16 Claims, 2 Drawing Sheets

(56) References Cited

U.S. PATENT DOCUMENTS

| | | | | |
|---|---|---|---|---|
| 5,901,172 | A * | 5/1999 | Fontana | G01S 7/292 329/311 |
| 5,936,524 | A * | 8/1999 | Zhevelev | G01S 7/4004 340/521 |
| 6,191,725 | B1 * | 2/2001 | Lavoie | G01S 7/34 342/195 |
| 6,781,540 | B1 * | 8/2004 | MacKey | G01S 13/90 342/188 |
| 6,995,706 | B2 * | 2/2006 | Ohlsson | G01F 23/284 342/118 |
| 7,088,794 | B2 * | 8/2006 | Nichols | H03G 3/3052 341/139 |
| 7,477,182 | B2 * | 1/2009 | Ikeda | G01S 7/34 342/118 |
| 7,515,091 | B2 | 4/2009 | Meyers et al. | |
| 7,541,972 | B1 * | 6/2009 | Dougherty | G01S 7/34 342/175 |
| 7,800,528 | B2 * | 9/2010 | Nilsson | G01F 23/284 342/124 |
| 8,098,193 | B2 * | 1/2012 | Sai | G01S 13/0209 342/102 |
| 8,334,802 | B2 * | 12/2012 | Ogawa | G01S 7/023 342/118 |
| 9,024,806 | B2 * | 5/2015 | Hemmendorff | G01S 7/28 342/118 |
| 2004/0004905 | A1 * | 1/2004 | Lyon | G01S 7/52004 367/13 |
| 2005/0024259 | A1 * | 2/2005 | Berry | G01F 23/284 342/124 |
| 2006/0000275 | A1 * | 1/2006 | Nilsson | G01F 23/284 73/290 V |
| 2006/0012512 | A1 * | 1/2006 | Jirskog | G01F 23/284 342/124 |
| 2006/0066473 | A1 | 3/2006 | Yokoyama et al. | |
| 2008/0136704 | A1 * | 6/2008 | Chan | G01S 7/282 342/201 |
| 2008/0282794 | A1 * | 11/2008 | Jirskog | G01F 23/284 73/292 |
| 2009/0033543 | A1 * | 2/2009 | Nilsson | G01F 23/284 342/124 |
| 2010/0109963 | A1 * | 5/2010 | Kienzle | G01F 23/284 343/786 |
| 2010/0201563 | A1 * | 8/2010 | Flasza | G01F 23/284 342/124 |
| 2010/0223019 | A1 * | 9/2010 | Griessbaum | G01F 23/2962 702/75 |
| 2010/0265121 | A1 * | 10/2010 | Bandhauer | G01S 7/2923 342/135 |
| 2011/0102243 | A1 * | 5/2011 | Sai | G01S 13/0209 342/124 |
| 2011/0177789 | A1 * | 7/2011 | Cheng | H03F 1/223 455/73 |
| 2011/0187579 | A1 * | 8/2011 | Asada | G01S 13/30 342/27 |
| 2012/0319891 | A1 * | 12/2012 | Edvardsson | H01Q 1/225 342/124 |
| 2013/0076559 | A1 * | 3/2013 | Edvardsson | G01S 13/36 342/124 |
| 2013/0250460 | A1 * | 9/2013 | Grozinger | G01F 15/06 361/54 |
| 2013/0269430 | A1 | 10/2013 | Mauduit et al. | |
| 2013/0300595 | A1 * | 11/2013 | Hemmendorff | G01S 7/28 342/124 |
| 2014/0104098 | A1 * | 4/2014 | Linden | G01F 23/284 342/124 |
| 2015/0338261 | A1 * | 11/2015 | Mueller | G01S 7/032 342/124 |

* cited by examiner

MULTI-MODE PULSED RADAR PROVIDING AUTOMATIC TRANSMIT PULSE SIGNAL CONTROL

FIELD

Disclosed embodiments relate to systems and methods for determining the level of a product in a storage tank by using radar signals emitted to the product surface and analyzing radar signals reflected from the product surface.

BACKGROUND

It is standard practice to use large metal storage tanks for storing a variety of liquids, such as beverage and petroleum products. Conventional large storage tanks are usually made from non-stainless steel plates, and in the case of petroleum products the storage tanks are generally made from ¼ inch (0.63 cm) to ½ inch (1.27 cm) thick steel plates welded together. The dimensions of conventional large storage tanks usually range in the hundreds of feet (100 feet=30.5 meters) in height and hundreds of feet in diameter.

Non-contact electromagnetic detection and sensing may be used to determine the presence or signatures (object classification or shape) of objects, or levels or the distance to the surface of materials, when other sensing methods have difficulty in providing reliable and/or accurate information. For example, in the oil and gas industry, inaccurate or unreliable tank level measurements can incur a significant loss of profitability/revenue in tank level gauging applications. An error of 1 millimeter (mm) of the level measurement in bulk storage tanks (40-80 meters in diameter) can correspond to volumetric error of several cubic meters. Since the crude oil price is generally at least $100 per barrel (1 barrel=42 US gallons; 159 liters), the 1-mm error can result in thousands of dollars loss for one or more parties involved in trading and oil transfer.

RAdio Detection And Ranging (Radar) has been used as a type of non-contact product level gauge for several decades. The radar system includes a transmitter coupled to a radar antenna which is positioned above the product (e.g., a liquid or solid) for emitting radar signals to the product and a receiver coupled to the antenna (or to another antenna) for receiving radar signals reflected from the product surface, as well as a signal processor for determining the product level on the basis of the emitted radar signals and the reflected radar signals. According to this method, the antenna driven by transmit circuitry emits a radar signal which strikes an object or surface, for example a liquid surface. The object or surface reflects part of the emitted radar signal/wave back in the direction of the antenna, which receives and is coupled to receive circuitry that processes the reflected radar signal/wave.

Pulse radars as a non-destructive/non-contact sensor for liquid level measurements are widely used, because they are relatively inexpensive and simple to install. Selection of the radar frequency used is a design selection for the radar system. In comparison of lower frequency pulse radars (e.g. C-band, such as (4 GHz to 8 GHz), higher frequency pulse radars can use a smaller antenna, have narrower beam-width and provide higher accuracy. However, higher frequency pulse radars (e.g., K band, 18 to 27 GHz) do not withstand signal attenuation compared to lower frequency pulse radars. However, although lower frequency pulsed radars have poor accuracy and larger antenna dimension and wide beam-width compared to higher frequency pulsed radar and lower frequency radars suffer from interference of unwanted reflections caused by obstacles appearing in the radar beam, lower frequency radars can withstand attenuation relatively better and keep the signal-to-noise ratio (SNR) relatively stable.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments include pulse radar systems and methods including a multi-mode pulse transmitter which provides automatic transmit pulsed signal control configured to operate in a high frequency band, such as the K-band being in a portion of the radio spectrum in the microwave range of frequencies ranging between 18 and 27 GHz (K-band), with which different measurement scenarios are dealt with automatically. "Multi-mode" as used herein refers to the pulsed radar signals transmitted with high or low amplitude, narrow or wide pulses, which can be automatically switched based on disclosed software and methods to respond to different application scenarios, including a signal mode selection based on the distance from the radar antenna to the top of the target material below the radar antenna in the tank. Disclosed multi-mode radar addresses the problem of high frequency pulse attenuation which enables disclosed pulse radar systems to use smaller antennas, and enables measuring from longer distances with higher accuracy as compared to known radar systems.

Disclosed embodiments include a multi-mode pulsed radar method for sensing or measuring a product material in a storage tank including providing a measure of radar signal attenuation for pulsed radar signals transmitted to the product material. Automatic adjustment of one or more transmitted radar pulse parameters is implemented by selecting at least one of a pulse width and a pulse amplitude based on the measure of radar signal attenuation. In signal mode 2, higher amplitude and/or wider pulses can be selected when the measure of radar signal attenuation is relatively high, and lower amplitude and/or narrower pulses can be used in signal mode 1 when the measure of radar signal attenuation is relatively low. The radar pulse is transmitted to the product material using the selected pulse width and the pulse amplitude. The target signal reflected or scattered from the product material is processed to determine at least one parameter, such as distance, product level, and signature. Other disclosed embodiments include multi-mode pulse transmitters for pulsed radar systems and pulsed radar systems therefrom.

DETAILED DESCRIPTION

Figure 1:
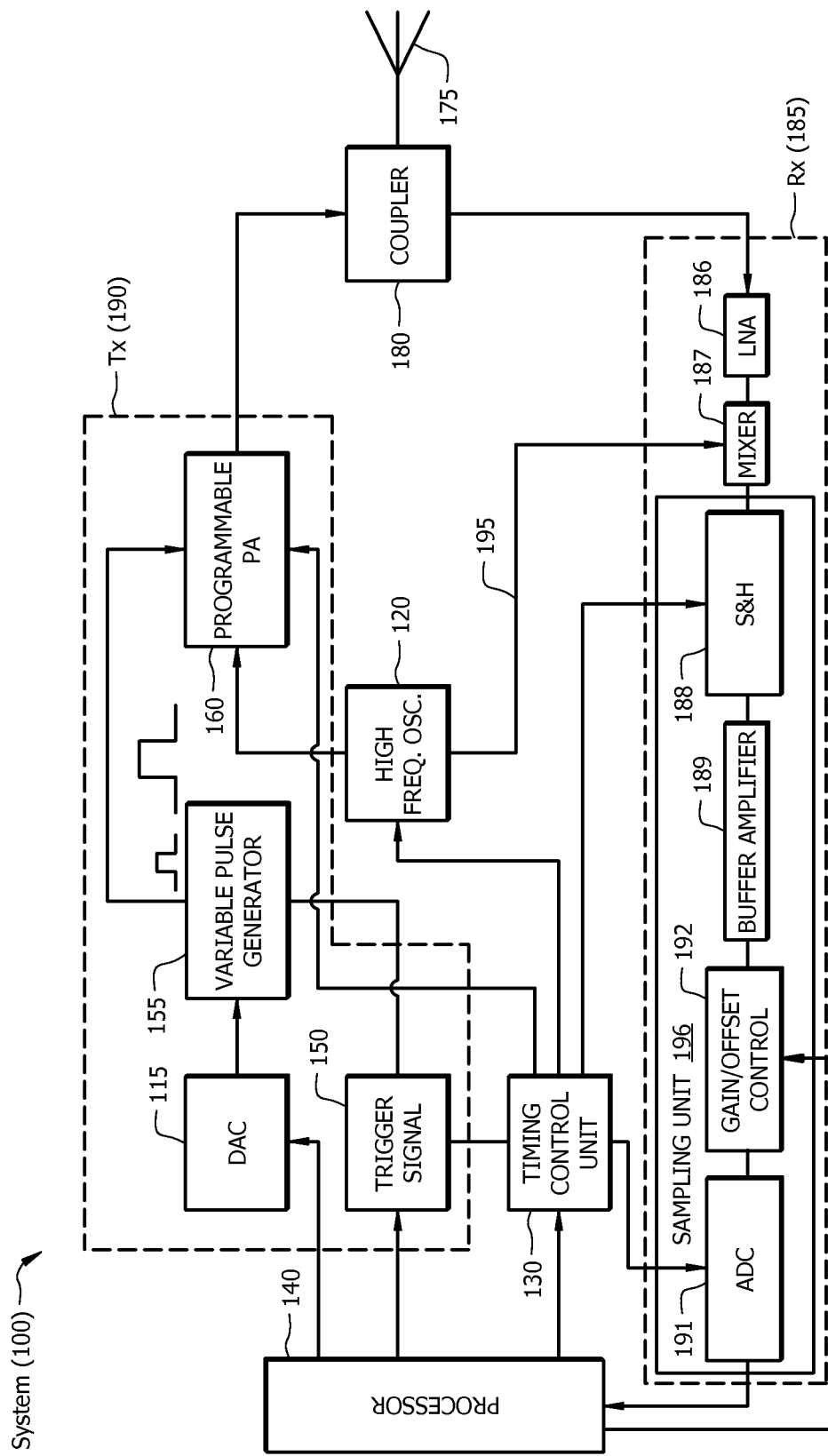
FIG. 1 is a block diagram illustration of an example pulse radar system including a multi-mode radar transmitter which provides automatic transmit pulse signal control, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Disclosed embodiments include a multi-mode pulse radar system that provides transmit pulse signal control and methods for inspecting a storage tank that includes a product material therein, such as a liquid or solid (e.g., powder). FIG. 1 is an example block diagram illustration of an example pulse radar system 100 including a multi-mode radar transmitter (Tx) 190 which provides automatic transmit signal control, along with a receiver (Rx) 185, according to an example embodiment. Blocks common to the Rx 185 and Tx 190 (e.g., high frequency oscillator 120, and timing control unit 130) are not shown being within either Tx 190 or Rx 185. System 100 provides time domain radar sensing and measurements for applications including, but not limited to, distance, product level, and signature determination. The respective blocks in FIG. 1 can be realized in both integrated circuit (IC) and discrete circuit form, respectively.

The Tx 190 shown in FIG. 1 provides a programmable transmit radar signal implemented by a programmable power amplifier (PA) 160 which is controlled by a variable pulse generator 155. The timing for the variable pulse generator 155 is provided by trigger signals from a trigger signal generator 150, and pulse amplitude and width information is provided from a processor 140 through a digital-to-analog converter (DAC) 115. Processor 140 can compromise a digital signal processor (DSP) or microcontroller unit (MCU).

The signal modes for the system 100 are thus digitally controlled and automatically switched by the processor 140, which through DAC 115 selects the signal mode for the Tx pulse with its corresponding pulse width and pulse amplitude. The signal modes comprise at least two (2) signal modes which control the pulse amplitude and width based on at least one of the distance from the transmitting antenna 175 to the product material in the tank being measured, the attenuation properties of the product material/media in the tank, and optionally also a dielectric property of the propagation media between the antenna 175 and the product material. The distance to the product material in the tank being measured can be obtained (e.g., predicted or traced) from previous measured target reflections/scatterings in the tank by measuring the return time of the radar pulse, and the attenuation properties of the product material can generally be determined based on signal propagation loss and the product material's properties such as permittivity, surface roughness, etc. A compensation curve for signal loss can be compiled by a radar algorithm during actual measurements to automatically generate the pulse amplitude and the pulse width settings to be used.

The variable pulse generator 155 is shown with two example pulses adjacent to its block, one pulse being relatively narrow with a relatively low amplitude (and thus lower power) which is practical for short distance sensing, and the other pulse being wider with a higher amplitude (and thus higher power) which can be more robust for longer distance sensing and/or under difficult radar signal propagating conditions. Variable pulse generator 155 can for example comprise circuitry based on complementary metal-oxide-semiconductor (CMOS) technology, a NAND gate with two identical input signals which are separated by a delay of a few hundred picoseconds to several nanoseconds, which can be controlled by an analog control signal from the DAC 115. Pulse timing for the variable pulse generator 155 is provided by trigger signals from the trigger signal generator block 150, and the DAC 115 provides analog control signals for pulse width (the pulse width information received in digital form from processor 140) to the variable pulse generator 155.

System 100 includes timing control unit 130, where the timing control unit 130 is coupled to the processor 140. Timing control unit 130 is generally hardware-based, but can also be implemented in software by the processor 140. The synchronization between the timing instant of the Tx 190 and Rx 185 "channels" of the system 100 is generally refined by the processing and control algorithms run by the processor 140. Timing control unit 130 is coupled to programmable PA 160 and high frequency oscillator 120 which is coupled to mixer 187. Timing control unit 130 is shown coupled to provide timing control and synchronization signals to the sample and hold (S&H) 188 and analog-to-digital converter (ADC) 191 of Rx 185.

High frequency oscillator 120 provides its output as the input for programmable power amplifier 160. High frequency oscillator 120 also provides a "local oscillator" signal to the mixer 187 in Rx 185. To conserve power, the high frequency oscillator 120 can be turned on and off in synchronization with the variable pulse generator 155. Since the gain of the programmable power amplifier 160 is controlled by processor 140 via control unit 130, the transmitted pulse width and amplitude is adjustable by the combination of variable pulse generator 155 and programmable power amplifier 160.

The Rx 185 is shown including example devices in series combination including a the coupler 180, low noise amplifier (LNA) 186 connected to the coupler 180, a mixer 187, and a sampling unit 196 including S&H 188, a buffer amplifier 189, optional gain/offset control block 192 and a ADC 191. The optional gain/offset control block 192 shown can be used for additional gain tuning and offset removal, or for only offset removal. An output of the ADC 191 is connected to the processor 140. As used herein a "LNA" refers to a special type of electronic amplifier used in telecommunication systems which amplifies very weak signals captured by an antenna. When using a LNA, circuitry is configured so that noise figure is reduced by the gain by the amplifier while the noise of the amplifier is injected directly into the received signal.

Disclosed Rx circuitry recognizes since a conventional low-cost ADC cannot perform an essentially instantaneous digital conversion of a very short pulse, the input value is held constant during the time that the ADC performs a digital conversion (the conversion time typically on the order of from microseconds to tens of microseconds). S&H 188 performs this task, typically using a capacitor to store the analog voltage at the input, and then using an electronic switch or gate to disconnect the capacitor from the input. Although typical ADC integrated circuits (ICs) include the S&H circuitry internally to the IC, the time interval of sampling for such devices is so tiny (on the order of picoseconds) so that disclosed embodiments generally instead use an external S&H circuit 188 that is externally triggered, such as by a suitable triggering circuit (e.g., from timing control unit 130, such as implemented with Bi-CMOS circuitry).

Disclose systems can operate using a wide range of pulse frequencies. One embodiment utilizes a carrier frequency at K-band (18 GHz to 27 GHz), but the carrier frequency may also be at other bands. The radar pulses may comprise Ultra-WideBand (UWB) radar pulses. "UWB" as used herein refers to a pulse bandwidth of at least 0.5 Giga Hertz (GHz) or fractional bandwidth of at least 25% of the center frequency (which is based on the U.S. Defense Advanced Research Projects Agency's (DARPA's) UWB definition), while UWB ranges in frequency spectrum can be anywhere between 100 MHz and 300 GHz.

UWB radar systems transmit signals across a much wider frequency range as compared to conventional narrow-band pulse radar systems. The transmitted UWB signal is significant for its very light power spectrum, which is typically lower than the government allowed unintentional radiated emissions for electronics. The most common technique for generating a UWB signal is generally to transmit pulses with very short pulse durations (e.g., <1 ns). The UWB pulse covers a very large frequency spectrum, and the frequency spectrum becomes larger as the pulse width becomes narrower.

As described above, the signal modes are digitally controlled and automatically switched by processor 140 which selects the signal mode including the pulse width and pulse amplitude to be used for the transmitted radar pulse. The signal modes are based on at least one of the distance to the product in the tank being measured, and the attenuation properties of the product material. Higher power pulses (higher amplitude and/or longer pulse widths) are generally used for longer distances, and lower power pulses (lower amplitude and/or shorter pulse widths) are generally used for shorter distances. There can be a power adjustment for the signal loss at the interface with the product material, for example, with an upward power adjustment (due to more loss) for low dielectric constant product materials (e.g. dielectric constant <1.4), and a downward power adjustment (due to more loss) for high dielectric constant materials (e.g., a dielectric constant >2).

The signal modes can also comprise three (3) signal modes. For example, signal mode 1 can comprise a low relative power mode for shorter distances (e.g., <20 m) for a product material having a substantially nominal attenuation, with the maximum distance for utilizing signal mode 1 optionally reduced for a high relative attenuation product material. In signal mode 1, for example, pulses can be created with a pulse width of less than 0.5 ns and low amplitude (e.g. <1V) which can be based on the physics limit for ultra short pulses. The "physics limit" as used herein refers to the shorter the pulse the more difficult it is to generate a high amplitude pulse. The resulting range accuracy for signal mode 1 operation is generally high.

For example, signal mode 2 can comprise a higher relative power mode for longer distances (e.g., >50 m) with the minimum distance for signal mode 2 optionally increased for high relative attenuation product material. In signal mode 2, for example, the pulses can be created with a pulse width of larger than 1 ns (e.g., 1.2 to 2 nsec) and a higher pulse amplitude than the pulse amplitude in signal mode 1 (e.g., 10V). The accuracy of signal mode 2 is reasonably high, since the SNR is high due to a higher amplitude and longer pulse width integration than used in signal mode 1.

For example, signal mode 3 can comprise an intermediate relative power mode for intermediate distances (e.g., 20 m to 50 m), with the 20 m minimum distance optionally increased for high relative attenuation product material, and the 50 m maximum distance reduced for high relative attenuation product material. The pulse amplitude and pulse width can be automatically adjusted by a processor 140 to select their respective values between scenario 1 and 2 for good performance, such as a pulse width between 0.5 and 1 ns, and a pulse amplitude adjustable in the range of about 20 dB.

Figure 2:
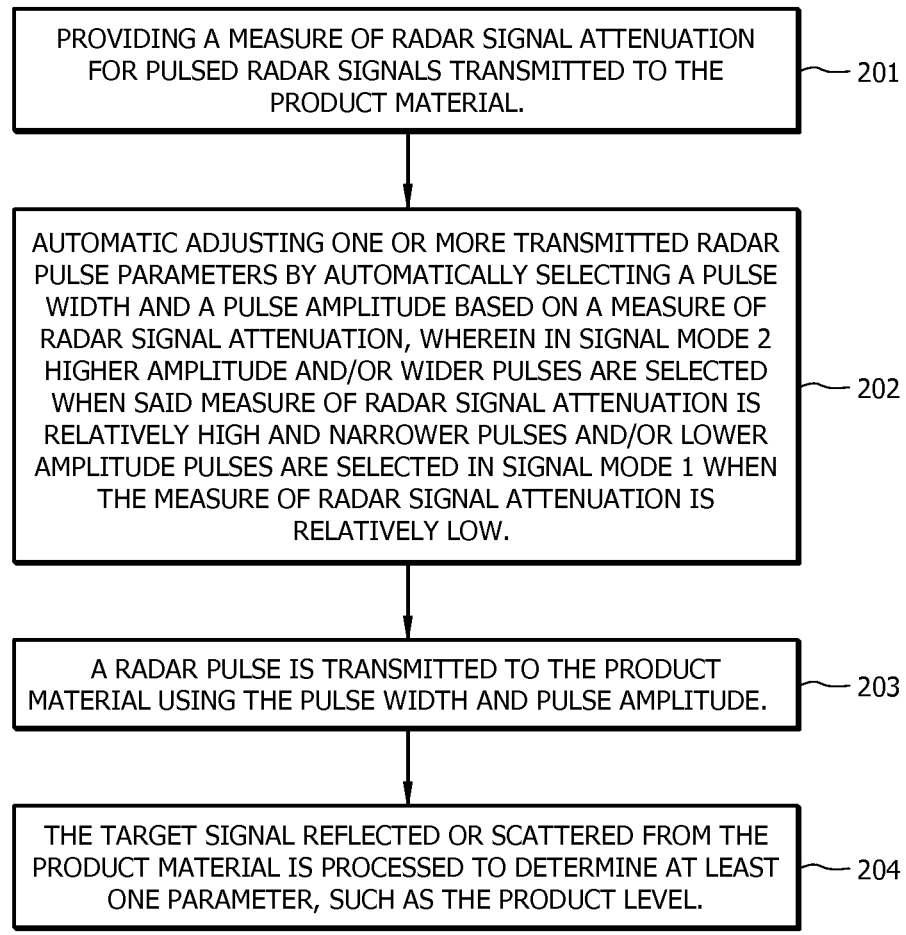
FIG. 2 is a flow chart for a method of sensing or measuring a product material in a storage tank using automatic transmit pulse signal control, according to an example embodiment.

FIG. 2 is a flow chart for an example multi-mode pulsed radar method 200 for sensing or measuring a product material in a storage tank using automatic transmit pulse signal control, according to an example embodiment. Step 201 comprises providing a measure of radar signal attenuation for pulsed radar signals transmitted to the product material. Step 202 comprises automatic adjustment of one or more transmitted radar pulse parameters by selecting at least one of a pulse width and a pulse amplitude for a transmitted radar pulse based on the measure of radar signal attenuation. In signal mode 2 higher amplitude and/or wider pulses are generally selected when the measure of radar signal attenuation is relatively high and in signal mode 1 narrower pulses and/or lower amplitude pulses are selected when the measure of radar signal attenuation is relatively low. In step 203 the radar pulse is transmitted to the product material using the selected pulse width and the pulse amplitude. Step 204 comprises processing the target signal reflected or scattered from the product material to determine at least one parameter, such as the product level.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. A multi-mode pulsed radar method for sensing or measuring a product material in a storage tank, comprising:
providing a measure of radar signal attenuation for pulsed radar signals transmitted to said product material;
implementing automatic adjustment of one or more transmitted radar pulse parameters by automatically selecting a pulse width and a pulse amplitude based on said measure of radar signal attenuation, wherein in signal mode 2 higher amplitude and/or wider pulses are selected when said measure of radar signal attenuation is relatively high and lower amplitude and/or narrower pulses are selected in signal mode 1 when said measure of radar signal attenuation is relatively low,
transmitting a radar pulse from an antenna to said product material using said pulse width and said pulse amplitude, and
processing a target signal reflected or scattered from said product material to determine at least one parameter.

2. The method of claim 1, wherein said measure of radar signal attenuation includes a distance from a said antenna to said product material in said storage tank and a dielectric property of said product material.

3. The method of claim 2, wherein said measure of radar signal attenuation includes said distance, said dielectric property of said product material, and a dielectric property of a propagation media between said antenna and said product material.

4. The method of claim 1, wherein said radar pulse comprises an Ultra-WideBand (UWB) radar pulse.

5. The method of claim 1, said pulse width in signal mode 2 is <1 nsec, and said pulse width in signal mode 1 is >1 nsec.

6. The method of claim 1, further comprising a power adjustment to compensate for signal loss at an interface with said product material including an upward power adjustment for said radar pulse for dielectric constant materials below a predetermined lower dielectric constant and a downward power adjustment for said radar pulse for dielectric materials below a predetermined higher dielectric constant.

7. The method of claim 6, wherein said predetermined lower dielectric constant is <1.4 and said predetermined higher dielectric constant is >2.

8. The method of claim 1, wherein said radar pulse is transmitted at a frequency of at least 18 GHz, and said frequency is held constant when switching between said signal mode 1 and said signal mode 2.

9. A multi-mode pulse transmitter for a pulsed radar system for sensing or measuring a product material in a storage tank, comprising:
a processor, respective outputs of said processor coupled to control a digital-to-analog converter (DAC), a trigger signal generator, and a timing control unit;
a variable pulse generator having respective inputs coupled to an output of said DAC and an output of said trigger signal generator, wherein timing for said variable pulse generator is provided by trigger signals from said trigger signal generator and pulse amplitude and pulse width information from said processor based on at least one of a distance to said product material in said storage tank and attenuation properties of said product material through said DAC, and
a programmable power amplifier having inputs coupled and controlled by said variable pulse generator and said timing control unit, an output of said programmable power amplifier coupled to an antenna;
wherein a gain of said programmable power amplifier is controlled by said processor via said control unit, and
wherein said programmable power amplifier provides at least a signal mode 1 and signal mode 2 having selected adjustment of one or more transmitted radar pulse parameters with automatic selection of a pulse width and pulse amplitude for a radar pulse based on at least one of said distance to said product material and said attenuation properties of said product material, and wherein in signal mode 2 higher amplitude and/or wider pulses are selected when a measure of radar signal attenuation is relatively high and lower amplitude and/or narrower pulses are selected in signal mode 1 when said measure of radar signal attenuation is relatively low.

10. The multi-mode pulse transmitter of claim 9, wherein said measure of radar signal attenuation includes a distance from said antenna to said product material in said storage tank and a dielectric property of said product material.

11. The multi-mode pulse transmitter of claim 9, wherein said radar pulse comprises an Ultra-WideBand (UWB) radar pulse.

12. The multi-mode pulse transmitter of claim 9, wherein said processor implements a power adjustment to compensate for signal loss at an interface with said product material including an upward power adjustment for said radar pulse for dielectric constant materials below a predetermined lower dielectric constant and a downward power adjustment for said radar pulse for dielectric materials below a predetermined higher dielectric constant.

13. A multi-mode pulsed radar system, comprising:
a transmitter (Tx) comprising:
a processor, respective outputs of said processor coupled to control a digital-to-analog converter (DAC), a trigger signal generator, and a timing control unit;
a variable pulse generator having respective inputs coupled to an output of said DAC and an output of said trigger signal generator, wherein timing for said variable pulse generator 155 is provided by trigger signals from said trigger signal generator and pulse amplitude and pulse width information from said processor based on at least one of a distance to said product material in a storage tank and attenuation properties of said product material through said DAC, and
a programmable power amplifier having inputs coupled and controlled by said variable pulse generator and said timing control unit, and an output coupled to an antenna;
wherein a gain of said programmable power amplifier is controlled by said processor via said control unit, and
wherein said programmable power amplifier provides at least a signal mode 1 and signal mode 2 having selected adjustment of one or more transmitted radar pulse parameters with automatic selection of a pulse width and a pulse amplitude for a radar pulse based on at least one of said distance to said product material and said attenuation properties of said product material, wherein in signal mode 2 higher amplitude and/or wider pulses are selected when said measure of radar signal attenuation is relatively high and lower amplitude and/or narrower pulses are selected in signal mode 1 when said measure of radar signal attenuation is relatively low;
a receiver comprising:
a low noise amplifier (LNA) connected to said antenna or another antenna, a sampling unit including a sample and hold (S&H) and a analog-to-digital converter (ADC) controlled by said timing control unit, wherein an output of said ADC is connected to said processor.

14. The system of claim 13, wherein said measure of radar signal attenuation includes a distance from said antenna to said product material in said storage tank, a dielectric property of said product material, and a dielectric property of a propagation media between said antenna and said product material.

15. The system of claim 13, wherein said radar pulse comprises an Ultra-WideBand (UWB) radar pulse.

16. The system of claim 13, wherein said processor implements a power adjustment to compensate for signal loss at an interface with said product material including an upward power adjustment for said radar pulse for dielectric constant materials below a predetermined lower dielectric constant and a downward power adjustment for said radar pulse for dielectric materials below a predetermined higher dielectric constant.

* * * * *